United States Patent
Vialette

(10) Patent No.: US 6,674,384 B2
(45) Date of Patent: Jan. 6, 2004

(54) PROCESS AND DEVICE FOR MAKING SECURE THE PROCESSING OF SAFETY SIGNALS, ON LIFTING APPARATUS

(75) Inventor: Philippe Vialette, Baudemont (FR)

(73) Assignee: Potain, Ecully (FR)

(*) Notice: Subject to any disclaimer, the term of this patent is extended or adjusted under 35 U.S.C. 154(b) by 57 days.

(21) Appl. No.: 09/982,922

(22) Filed: Oct. 22, 2001

(65) Prior Publication Data

US 2002/0093444 A1 Jul. 18, 2002

(30) Foreign Application Priority Data

Nov. 30, 2000 (FR) .............................. 00 15528

(51) Int. Cl.$^7$ .............................................. H03M 1/12
(52) U.S. Cl. ........................... 341/155; 341/114; 341/11
(58) Field of Search .................. 341/155, 158, 341/164, 165, 114, 112

(56) References Cited

U.S. PATENT DOCUMENTS

| | | | | |
|---|---|---|---|---|
| 4,888,588 A | * | 12/1989 | Castagnozzi | ................ 341/122 |
| 5,155,422 A | * | 10/1992 | Sidman et al. | .............. 318/560 |
| 5,584,598 A | * | 12/1996 | Watanabe et al. | ........... 404/112 |
| 6,133,743 A | | 10/2000 | Gleixner et al. | ............ 324/683 |
| 6,597,295 B1 | * | 7/2003 | Fukuyama | ................... 341/58 |
| 6,600,434 B2 | * | 7/2003 | Ko et al. | ..................... 341/120 |

FOREIGN PATENT DOCUMENTS

| | | | | |
|---|---|---|---|---|
| FR | 2 705 453 A | 11/1994 | ............. | G01L/3/10 |
| GB | 2 300 484 A | 11/1996 | .......... | G01D/18/00 |

OTHER PUBLICATIONS

Li et al., "A Novel Smart Resistive–Capacitive Position Sensor", IEEE Transactions on Instrumentation and Measurement, IEEE, Inc., Jun. 1, 1995, vol. 44, No. 3, pp. 768–770.

* cited by examiner

Primary Examiner—Peguy JeanPierre
(74) Attorney, Agent, or Firm—Oliff & Berridge, PLC

(57) ABSTRACT

The invention makes secure the processing of a signal (Se) delivered by a sensor (2) of resistive analog type, in a safety device, the signal (Se) being converted into a digital signal (n) in an analog/digital converter (4) of resolution (R). A digital signal (n1) is acquired and stored, then the supply voltages (Va, Vb) of the sensor (2) are inverted (at 8) and a new digital signal (n2) is acquired. The two signals (n1, n2) are summed, and their sum (S) is compared with the resolution (R) of the converter (4). Depending on whether the sum (S) is or is not equal to the resolution (R), the control (Cm) of an actuator (6), corresponding to a pre-set (Sc), is enabled or otherwise.

Application to tower crane safety devices.

17 Claims, 3 Drawing Sheets

PROCESS AND DEVICE FOR MAKING SECURE THE PROCESSING OF SAFETY SIGNALS, ON LIFTING APPARATUS

BACKGROUND OF THE INVENTION

1. Field of Invention

The present invention relates, in a general manner, to monitoring/control devices for lifting apparatus, and more particularly to safety devices such as load limiters, torque limiters, motion (lifting, rotation, distribution, translation) limiters or speed limiters, provided on lifting apparatus such as tower cranes.

More particularly, the invention pertains to the making secure of the processing of the signal of the sensors of these safety devices, usually embodied in the form of sensors of resistive analog type, supplied electrically with DC current.

2. Description of Related Art

Among monitoring systems of safety devices of lifting apparatus, one generally encounters systems employing so-called "passive" analog sensors, that is to say ones which have to be supplied with power in order to operate, for example potentiometers, gauges or probes, these sensors being chosen on account of their low cost, their proven technology and their serviceability.

The use of monitoring systems of this kind, on lifting apparatus, requires that the acquisition pathway be made secure, this pathway conditioning and transmitting the analog signal delivered by a passive sensor such as this.

To make this acquisition pathway secure on lifting apparatus, the only known solution currently used is the redundancy of the circuits with comparison of the values acquired. Such a system is applied in particular on tower cranes constructed by the applicant company POTAIN.

The major drawbacks of this existing solution are its cost, its complexity of installation and its restricted availability since it leads to a doubling-up of the risks of malfunctioning.

SUMMARY OF THE INVENTION

The present invention aims to avoid these drawbacks, by providing a solution which, for identical security, is appreciably simpler and more economical, and reduces the risks of malfunctioning of the system.

Accordingly, the subject of the invention is essentially a process for making secure the processing of safety signals, more particularly of a signal delivered by a sensor of resistive analog type, supplied electrically with DC current, in a safety device on a lifting apparatus, the analog signal delivered by the sensor being converted into a digital signal in an analog/digital converter of given resolution, the process being characterized in that:

at a first instant, a digital signal corresponding to the analog signal delivered by the sensor is acquired and stored, then the supply voltages of the sensor are inverted, after this inversion, at a later instant, a new digital signal corresponding to the analog signal delivered by the sensor is acquired, the two digital signals acquired are summed, the sum of these two digital signals is compared with the resolution of the analog/digital converter, and if this sum is equal or approximately equal to the resolution of the converter, a control signal for operating an actuator of the lifting apparatus, corresponding to a control pre-set, is enabled, or if said sum is significantly different from the resolution of the converter, the control signal is not enabled.

Thus, the principle of the invention relies on the possibility of checking the operation of the pathway for acquiring the signal of a resistive analog sensor, simply by inverting the supply voltages of this sensor.

In the event of correct operation, the two digital signals, acquired respectively before and after this inversion, are "complementary", that is to say their sum is constant, and equal to the resolution of the analog/digital converter. Conversely, in the event of malfunctioning, the sum of the two relevant digital values is no longer equal to this resolution, thus allowing this malfunctioning to be readily detected.

According to a preferred mode of implementation of the process which is the subject of the invention, the analog signal, delivered by the sensor, is filtered and matched, so as to yield a digitizable analog signal which is the signal to be converted, before and after inversion of the supply voltages of the sensor.

Advantageously, in the case where the calculated sum of the two digital signals is significantly different from the resolution of the analog/digital converter, a signaling is emitted to indicate the state of malfunctioning.

The subject of the invention is also a device for the implementation of the process defined above.

This device is defined, essentially, as a device for making secure the processing of safety signals, more particularly of the signal delivered by a sensor of resistive analog type, supplied electrically with DC current, in a safety device on a lifting apparatus, the sensor being linked to an analog/digital converter of given resolution, which converts the analog signal delivered by the sensor into a digital signal transmitted to an arithmetic and logic processing unit which also receives a control pre-set, and which is able to deliver a control enable signal for operating a motion actuator for moving the lifting apparatus, the device being characterized in that it comprises, in combination:

control means for inverting the supply voltages of the sensor, means for acquiring the digital signals corresponding to analog signals delivered by the sensor, respectively before and after inversion of its supply voltages, means of summing the two digital signals acquired, and of comparing the sum of these two signals with the resolution of the analog/digital converter, and means of enabling/disabling the control of the actuator, corresponding to the pre-set, according to the result of the comparison of the aforesaid sum with the resolution of the converter.

The sensor being in particular a potentiometer, the means of control of inversion carry out the inversion of the supply voltages present at the terminals of the potentiometer.

Preferably, an analog conditioning circuit, intended for filtering and matching the analog signal delivered by the sensor, such as a potentiometer, is interposed between this sensor and the analog/digital converter.

In an advantageous embodiment of the device of the invention, the means of acquiring the two digital signals, of summing these signals, of comparing the sum of these signals with the resolution of the analog/digital converter, and of enabling/disabling the control according to the result of the comparison, are incorporated into the arithmetic and logic processing unit, the latter possessing an output linked to the means of control of inversion of the supply voltages of the sensor, which means are embodied in the form of an inversion circuit.

Advantageously, the arithmetic and logic processing unit, incorporating (as indicated above) the means of acquiring the two digital signals, of summing these signals and of comparing their sum with the resolution of the converter, is embodied in the form of a microprocessor.

By virtue of the process and of the device which are the subject of the invention, it becomes possible to implement a single sensor, instead of two sensors (for redundancy of the circuits, according to the prior technique), whilst still obtaining identical security, or even improved security. The invention also leads to a simplification of the wiring of the relevant lifting apparatus, since it requires the wiring of just one sensor, instead of two, hence a saving. Moreover, the invention diminishes the causes and decreases the risks of malfunctioning, since it implements a single security circuit, instead of two circuits. Finally, the system proposed by this invention is almost 100% reliable, and self-monitored: if the security circuit is itself defective, it does not instruct the inversion of the supply voltage of the sensor, so that the complementarity of the two digital signals is no longer ensured, and hence the system goes faulty.

The invention will in any case be better understood with the aid of the description which follows, with reference to the appended diagrammatic drawing representing, by way of example, an embodiment of this device for making secure the processing of safety signals, on lifting apparatus:

DETAILED DESCRIPTION OF EXEMPLARY EMBODIMENTS

Figure 1:
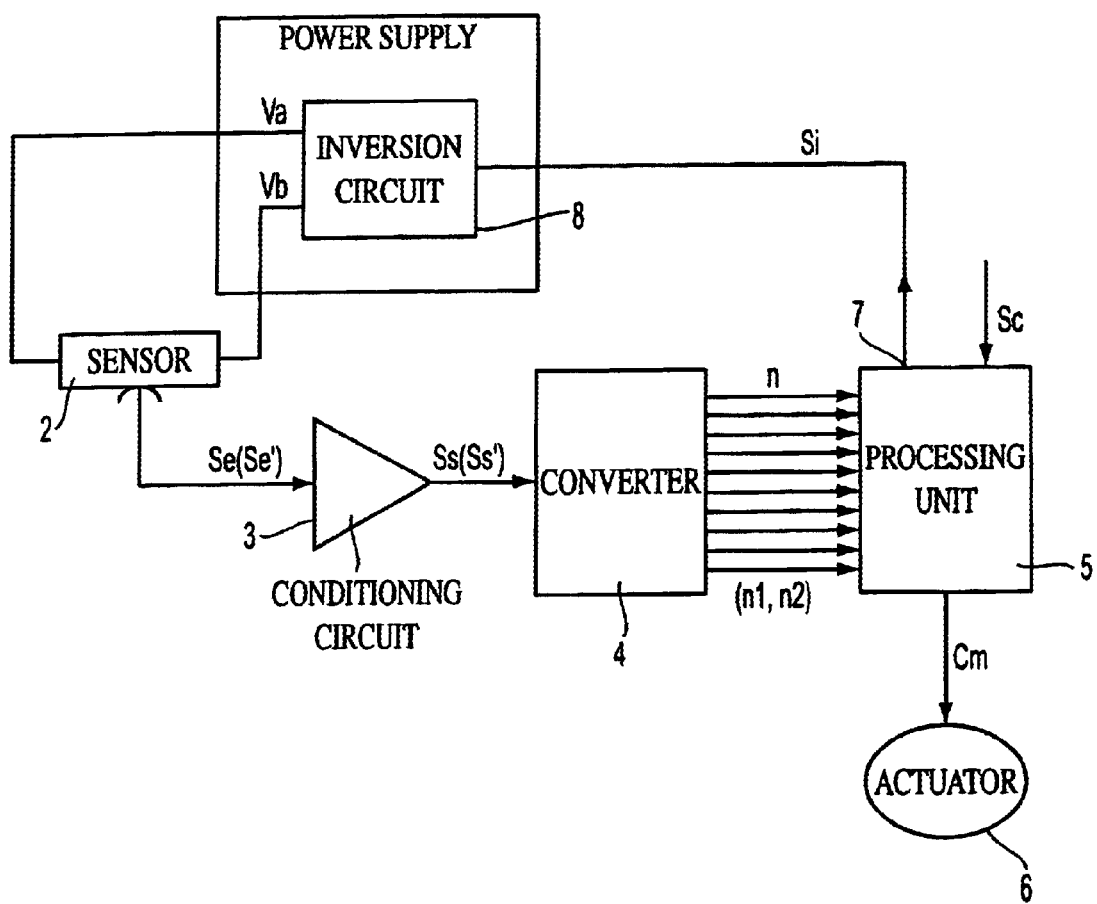
FIG. 1 represents the device which is the subject of the invention, in the form of a functional diagram.

FIG. 1 represents a certain number of elements of a monitoring/control system, known per se, to which the invention applies.

Thus, the system comprises a sensor 2 of resistive analog type, for example (as illustrated in the figure) a potentiometer, mounted suitably on a lifting apparatus. The sensor 2 is supplied electrically via a DC voltage (Vb−Va), Va and Vb designating the electrical voltages present respectively at the two extreme terminals of the potentiometer. The sensor 2 consisting of this potentiometer delivers an analog signal Se, dependent on the position of the slider of this potentiometer.

The system also comprises an analog conditioning circuit 3, intended for filtering the glitches and for matching the signal of the sensor 2. At its input this circuit 3 receives the signal Se, and delivers an analog signal Ss at its output.

The system further comprises an analog/digital converter 4, of resolution R, this resolution being for example 12 bits so that said converter can deliver digital values from 0 to 4095. At its input this analog/digital converter 4 receives the matched analog signal Ss, and at its output it delivers a digital signal, stated otherwise an integer number n, corresponding to the input signal Ss, hence to the signal Se of the sensor 2.

Finally, the system comprises in a known manner an arithmetic and logic processing unit 5, which can be embodied in the form of a microprocessor. The unit 5 receives the digital signal n delivered by the converter 4. It also receives a control pre-set Sc delivered by the operator of the lifting apparatus. This unit 5 delivers or otherwise a control signal Cm, so as to enable or otherwise the control of an actuator 6 of the relevant motion of the lifting apparatus, the actuator 6 generally being a motor, electric or hydraulic.

The security device which is the subject of the invention also comprises the arithmetic and logic processing unit 5, in particular in the form of a microprocessor, and a specific output 7 of this unit 5. This device further comprises a circuit 8 for inverting the supply voltages Va and Vb of the sensor 2, the output 7 of the unit 5 being linked to the input of the circuit 8.

The inversion circuit 8 possesses two outputs, on which are respectively present the two voltages Va and Vb, these two outputs being respectively connected to the two terminals of the potentiometer constituting the sensor 2.

The arithmetic and logic processing unit 5 is designed to deliver, on its output 7, a command Si for inverting the supply voltages of the sensor 2, according to an algorithm. This command Si is transmitted to the inversion circuit 8, which then orders the inversion of the supply voltages of the sensor 2. For example, before the inversion, the voltages at the outputs of the circuit 8 are: Va=−5 volts and Vb=+5 volts, whereas after inversion, these two voltages become, respectively: Va=+5 volts and Vb=−5 volts.

The operation of the device, described previously, is thus established, in detail, as follows:

At a certain instant t1, the sensor 2 delivers an analog measurement signal Se, transformed firstly by the circuit 3 into a digitizable analog signal Ss, then converted, in the converter 4, into a corresponding digital value n1. The unit 5 (microprocessor) stores the value n1 corresponding to the instant t1, and it delivers, on its output 7, the inversion signal Si. Receiving this signal Si, the inversion circuit 8 orders the inversion of the supply of the sensor 2.

Thus, at a later instant t2, the sensor 2 delivers an inverted analog signal Se, which is likewise matched by the circuit 3, then converted into a corresponding digital value n2. The unit 5 (microprocessor) acquires this new value n2.

Figure 3:
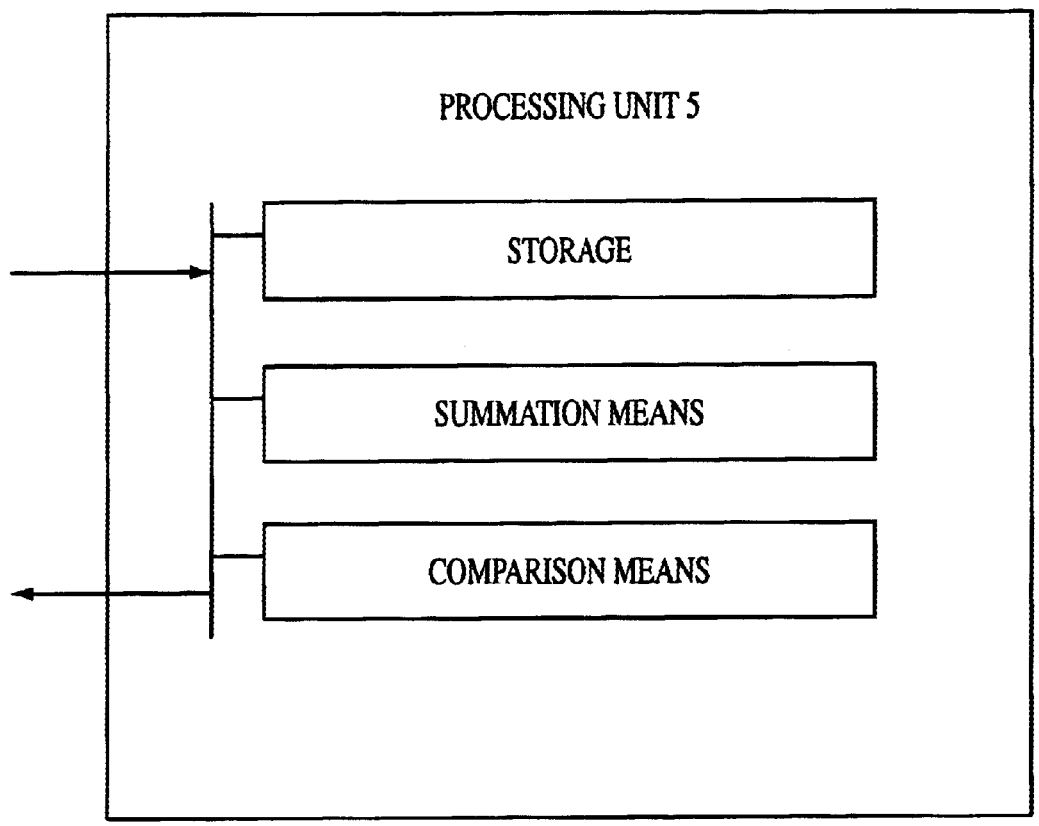
FIG. 3 is a block diagram of the processing unit 5 of FIG. 1.

The unit 5 (microprocessor) sums the two numbers n1 and n2, and it compares the result of the summation, i.e., a number S=n1+n2, with the solution R of the analog/digital converter 4, as shown in FIG. 3.

If the system is operating correctly, the two values n1 and n2, which correspond respectively to the signals Se of the sensor 2 before and after inversion of its supply, should be complementary, stated otherwise their sum S is equal or approximately equal to the resolution R of the converter 4. In this event, the unit 5 (microprocessor) enables the actuator 6 control signal Cm, corresponding to the control pre-set Sc.

Conversely, if the system is operating incorrectly, the two values n1 and n2, corresponding respectively to the signals Se of the sensor 2 before and after inversion of its supply, are no longer complementary, stated otherwise their sum S becomes significantly different from the resolution R of the converter 4. In this event, the unit 5 (microprocessor) no longer enables the signal Cm, so that the control of the actuator 6 is disabled. Simultaneously, the malfunctioning thus detected is taken into account, and signaled to the operator, for example by display on a monitoring screen. The operator then has the possibility of noting the malfunctioning, and optionally of giving the go-ahead to a "degraded" mode of working.

Figure 2:
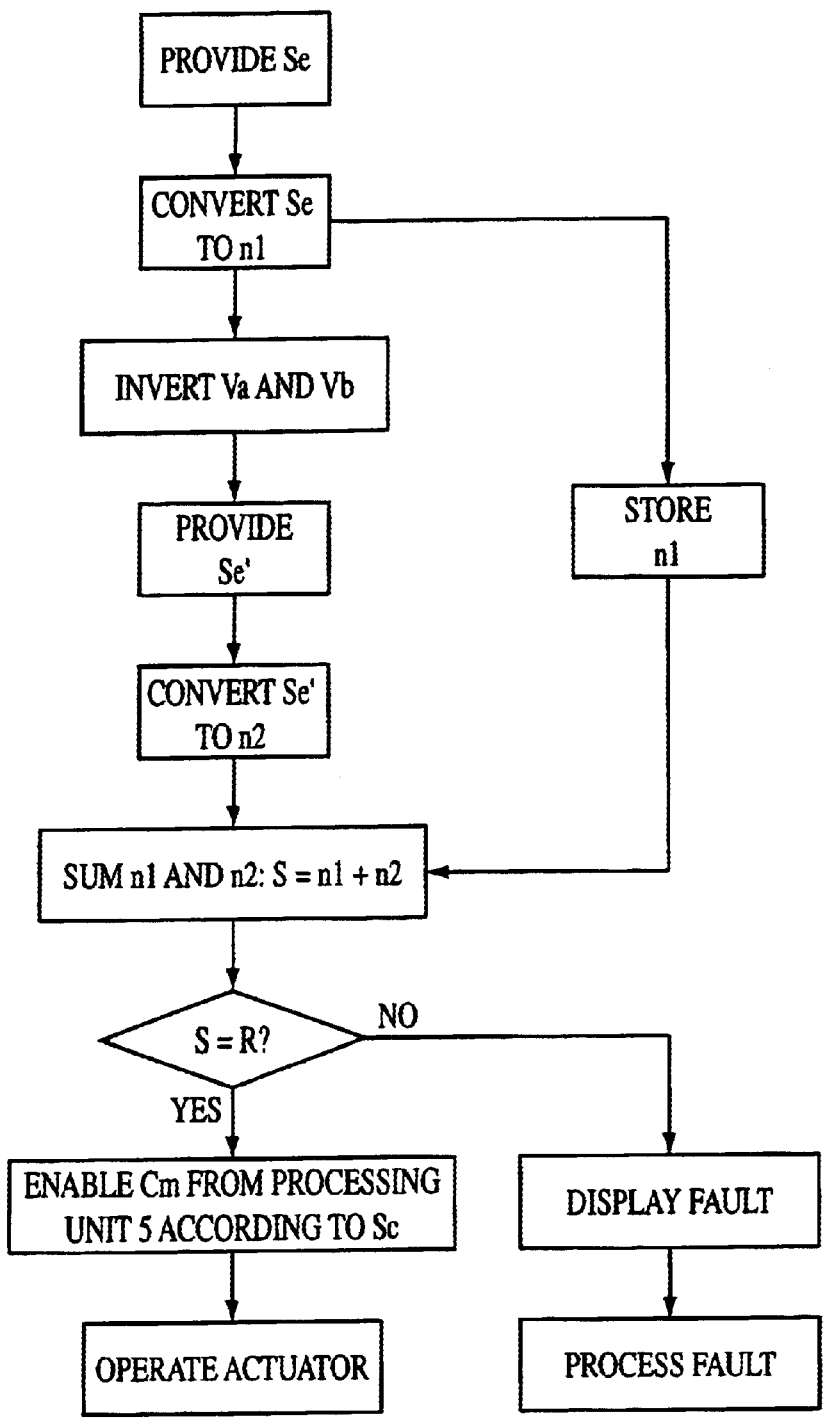
FIG. 2 is a flowchart which illustrates the operation of this device.

The operation of the device is further illustrated by the flowchart of FIG. 2, as well as by the table below, in which are indicated the valves n1 and n2, respectively before and after inversion of the supply of the sensor, and their sum S, for the extreme values, the median value and any value of the control setting; this table is referred to the normal state of the system, in which the sum S=n1+n2 is equal to the resolution R.

| Control setting | Sensor signal (Se) | Number (n1) | Inversion of the supplies (Se' = −Se) | Number (n2) | Sum (S) = n1 + n2 |
|---|---|---|---|---|---|
| Extreme value | Se = Va | n1 = 0 | Se = −Va = Vb | n2 = R | n1 + n2 = R |
| Median value | Se = 0 | n1 = R/2 | Se = 0 | n2 = R/2 | n1 + n2 = R |
| Extreme value | Se = Vb | n1 = R | Se = −Vb = Va | n2 = 0 | n1 + n2 = R |
| Any value | Va < Se < Vb | n1 = ((Vb + Se)/(Vb − Va)) · R | Vb < −Se < Va | n2 = ((Vb − Se)/(Vb − Va)) · R | n1 + n2 = R |

Observation of this table shows that the device is almost 100% reliable, since the only values which do not allow the detection of a malfunctioning by the process of the invention are situated in the middle of the sensor's range, for which the value of the signal Se of this sensor (before or after inversion) is equal to zero. However, this particular position corresponds to a nonpreferential zone of use, which is also a zone of nonrisk during use.

Moreover, the system is self-monitored since, if the security device is itself defective, it does not order the inversion of the supply of the sensor 2, so that the complementarity of the signals Se of this sensor, hence of the values n1 and n2, is no longer ensured. The system then also goes faulty, automatically.

The process and the device which are the subject of the invention are applicable to all types of safety using passive analog sensors, fitted to lifting apparatus and in particular tower cranes. They may involve safety devices related to the use of the crane, when working: load limiters, torque limiters, motion (lifting, rotation, distribution translation) limiters. They may also involve more particular functions such as: monitoring of the kinematics for erecting the crane (for example: simultaneous unfolding of the jib and of the mast), monitoring of stability (for example: tilt meter with jacks), monitoring of metal members (for example: monitoring of the voltage of the distribution cable), or other monitoring functions.

As goes without saying, and as emerges from the foregoing, the invention is not limited solely to the embodiment of this device for making secure the processing of safety signals which was described above, by way of example. On the contrary, it embraces all variant embodiments and variant applications thereof implementing the same process. Thus, in particular, one would not be departing from the scope of the invention by using any means carrying out the calculation operations and the logic operations, namely the adding of the values n1 and n2 and the comparing of their sum. By the same token, the invention remains applicable to lifting apparatus of all sorts, its field of application not being limited to tower cranes. Finally, although the invention has been described with relevance to the processing of the signal emanating from a single sensor, it will be clearly apparent to the person skilled in the art that the same components, such as the converter 4, the arithmetic and logic processing unit 5 and the inversion circuit 8, may also be common to several sensors (fitted to the same lifting apparatus), and in this case may process the signals delivered by all these sensors.

What is claimed is:

1. A process for making secure a processing of an analog signal delivered by a sensor of resistive analog type in a safety device on a lifting apparatus, the sensor supplied electrically with DC supply voltages, the analog signal delivered by the sensor being converted into a digital signal in an analog/digital converter of given resolution, the process comprising:

at a first instant, acquiring and storing a first digital signal corresponding to a first analog signal delivered by the sensor;

then, inverting the supply voltages of the sensor;

after the inversion, at a second instant, acquiring a second digital signal corresponding to a second analog signal delivered by the sensor;

summing the first and second digital signals;

comparing the sum of the first and second digital signals with the resolution of the converter; and if the sum is substantially equal to the resolution of the converter, enabling a control signal for operating an actuator of the lifting apparatus, corresponding to a control pre-set.

2. The process according to claim 1, wherein each of the first and second analog signals is filtered and matched so as to yield a digitizable analog signal.

3. The process according to claim 2, wherein, when the sum of the first and second digital signals is significantly different from the resolution of the converter, a signal is emitted to indicate a state of malfunctioning.

4. The process according to claim 1, wherein, when the sum of the first and second digital signals is significantly different from the resolution of the converter, a signal is emitted to indicate a state of malfunctioning.

5. A device for making secure a processing of an analog signal delivered by a sensor of resistive analog type in a safety device on a lifting apparatus, the sensor supplied electrically with DC supply voltages, the sensor being linked to an analog/digital converter of given resolution, wherein the converter converts the analog signal delivered by the sensor into a digital signal transmitted to an arithmetic and logic processing unit, the processing unit receives a control pre-set and is able to deliver a control enable signal for operating a motion actuator for moving the lifting apparatus, the device comprising:

control means for inverting the supply voltages of the sensor;

means for acquiring digital signals corresponding to analog signals delivered by the sensor, before and after inversion of the supply voltages of the sensor;

means for summing first and second digital signals, and for comparing the sum with the resolution of the converter, wherein the first and second digital signals are acquired from first and a second analog signals, respectively, the first and second analog signals being delivered by the sensor before and after the inversion, respectively; and means for enabling/disabling the control enable signal of the actuator, corresponding to the pre-set, according to a result of the comparison of the sum with the resolution of the converter.

6. The device according to claim 5, wherein the sensor is a potentiometer, and the control means for inverting the supply voltages is present at terminals of the potentiometer.

7. The device according to claim 6, wherein an analog conditioning circuit, intended for filtering and matching the analog signal delivered by the sensor, is interposed between the sensor and the converter.

8. The device according to claim 6, wherein the means for acquiring the digital signals, the means for summing the digital signals, the means for comparing the sum of the digital signals with the resolution of the converter, and the means for enabling/disabling the control according to the result of the comparison are incorporated into the processing unit, the processing unit possessing an output linked to the control means for inverting the supply voltages of the sensor, the control means for inverting is embodied in a form of an inversion circuit.

9. The device according to claim 6, further comprising a safety apparatus, wherein the device is incorporated in the safety apparatus, the safety apparatus being a load limiter, a torque limiter, a motion limiter, a speed limiter, or a monitoring device provided on tower cranes that use passive analog sensors.

10. The device according to claim 5, wherein an analog conditioning circuit, intended for filtering and matching the analog signal delivered by the sensor, is interposed between the sensor and the converter.

11. The device according to claim 10, wherein the means for acquiring the digital signals, the means for summing the digital signals, the means for comparing the sum of the digital signals with the resolution of the converter, and the means for enabling/disabling the control according to the result of the comparison are incorporated into the processing unit, the processing unit possessing an output linked to the control means for inverting the supply voltages of the sensor, the control means for inverting is embodied in a form of an inversion circuit.

12. The device according to claim 10, further comprising a safety apparatus, wherein the device is incorporated in the safety apparatus, the safety apparatus being a load limiter, a torque limiter, a motion limiter, a speed limiter, or a monitoring device provided on tower cranes that use passive analog sensors.

13. The device according to claim 5, wherein the means for acquiring the digital signals, the means for summing the digital signals, the means for comparing the sum of the digital signals with the resolution of the converter, and the means for enabling/disabling the control enable signal according to the result of the comparison are incorporated into the processing unit, the processing unit possessing an output linked to the control means for inverting the supply voltages of the sensor, the control means for inverting is embodied in a form of an inversion circuit.

14. The device according to claim 13, wherein the processing unit is a microprocessor.

15. The device according to claim 14, further comprising a safety apparatus, wherein the device is incorporated in the safety apparatus, the safety apparatus being a load limiter, a torque limiter, a motion limiter, a speed limiter, or a monitoring device provided on tower cranes that use passive analog sensors.

16. The device according to claim 13, further comprising a safety apparatus, wherein the device is incorporated in the safety apparatus, the safety apparatus being a load limiter, a torque limiter, a motion limiter, a speed limiter, or a monitoring device provided on tower cranes that use passive analog sensors.

17. The device according to claim 5, further comprising a safety apparatus, wherein the device is incorporated in the safety apparatus, the safety apparatus being a load limiter, a torque limiter, a motion limiter, a speed limiter, or a monitoring device provided on tower cranes that use passive analog sensors.

* * * * *